(No Model.) 2 Sheets—Sheet 2.

R. STONE.
GRAPPLE.

No. 262,330. Patented Aug. 8, 1882.

Witnesses
Chas H Smith
J Stail

Inventor
Roy Stone
per Lemuel W. Serrell atty

UNITED STATES PATENT OFFICE.

ROY STONE, OF NEW YORK, N. Y.

GRAPPLE.

SPECIFICATION forming part of Letters Patent No. 262,330, dated August 8, 1882.

Application filed January 16, 1882. (No model.)

*To all whom it may concern:*

Be it known that I, ROY STONE, of the city and State of New York, have invented an Improvement in Grapples, of which the following is a specification.

Grapples have been made of two hinged frames with fingers, and chains are used to open these frames, and by the action of a wheel and shaft the rope or chain is made to close the fingers previously to lifting the grapple.

My invention relates to the combination of hinged radial claws with a central support and chains, and a pulley for opening the claws and springs for closing such claws upon any article to be grappled, whereby irregular articles—such as stones—can be firmly grasped at the bottom of a river or bay and brought to the surface. I also combine with such claws a ball-joint and a coupling-tube, so that the parts are kept in proper position while the claws are being opened; but the entire head, with the radial claws, will turn and accommodate itself to the inclined position or shape of the article to be grappled, thereby insuring a more perfect hold upon such article and lessening the risk of injury either to the grapple or to the article, because a greater number of the claws will grasp the thing that is to be raised than would be possible if the grapple were rigidly connected to its operating-shank and could only close in a particular direction.

This grapple, although specially adapted to the removal of rocks and other substances under water, may be used for raising stones or other articles out of vessels or moving such articles from place to place on land.

Figure 1:
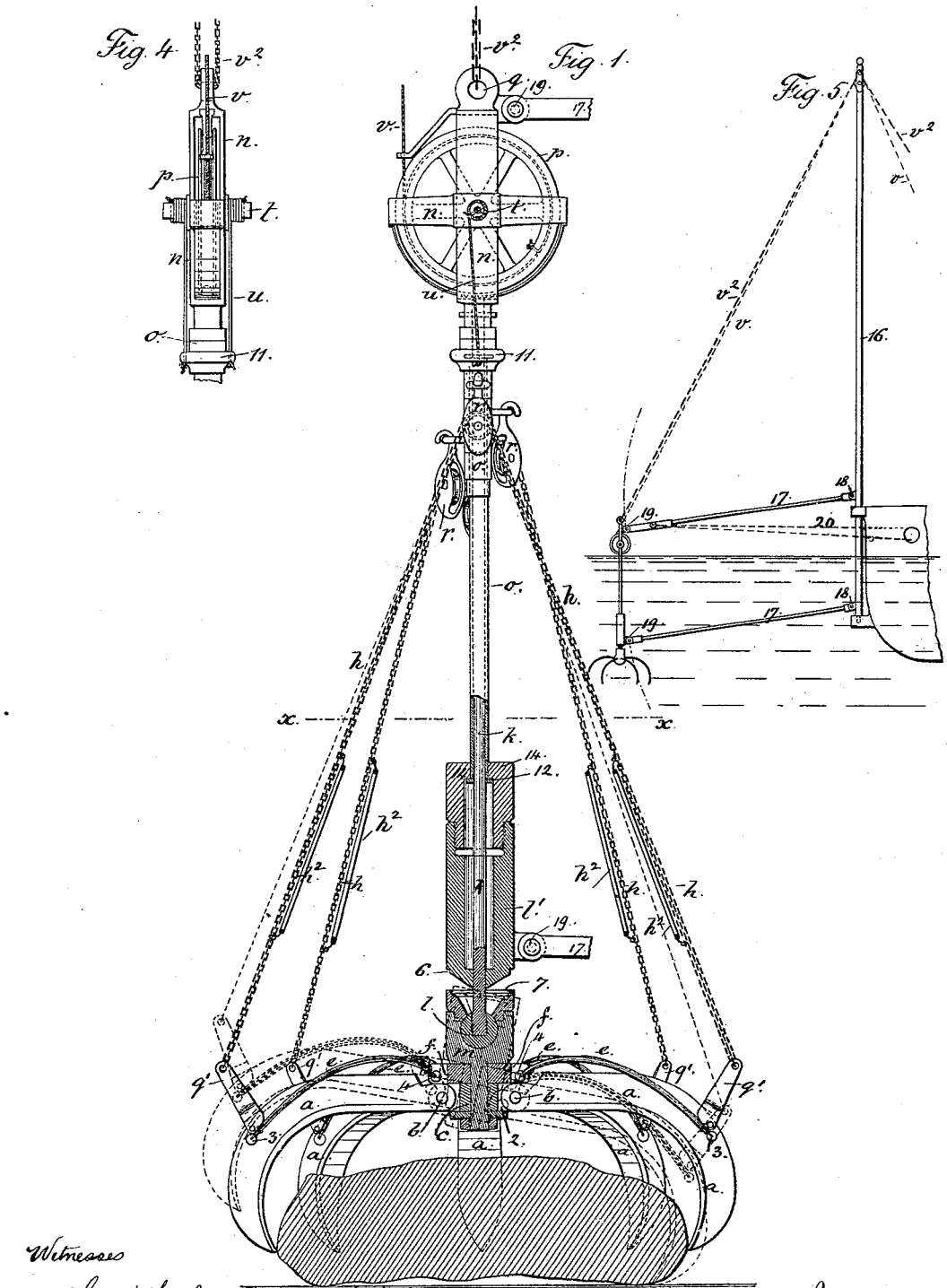
Figure 2:
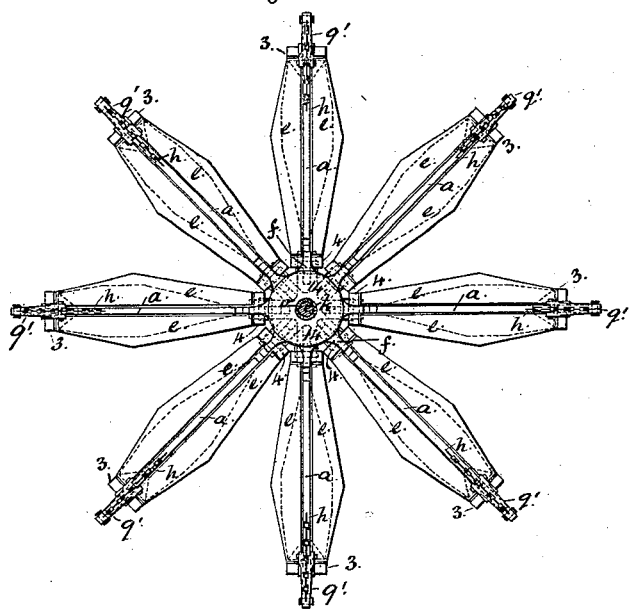
Figure 3:
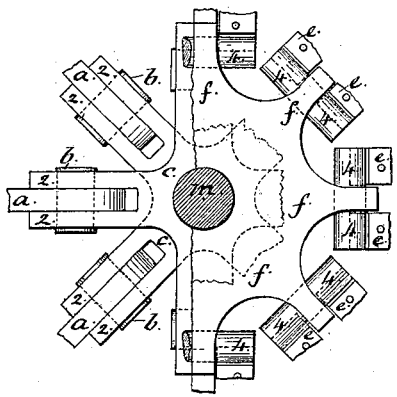

In the drawings, Figure 1 is an elevation partially in section of the grapple complete. Fig. 2 is a plan view below the line $x$ $x$, and Fig. 3 is a plan in larger size of the joints of the claws and of the springs. Fig. 4 is a view edgewise of the pulley around which passes the lowering-chain, and Fig. 5 is a diagram representing the means for holding the grapple vertical as it is raised or lowered upon a vessel or float.

Each claw $a$ is made pointed and with a ribbed back for obtaining the necessary strength, and the end is hooked, so as to catch around and hold any article with which it is brought into contact, and $b$ is the hinge-pin of the same.

The crown-piece $c$ is made with projecting joint-plates 2 2, between which the inner ends of the claws $a$ are received and through which the hinge-pins pass. These claws stand radially around the crown-piece, and in opening and closing these claws swing in radial planes. Each claw is provided with a pair of bow-springs, $e$, one end of each of which is hinged to the claw at 3 and the other end at 4 to the radial projections around the plate $f$. The rib at the back of the claw passes between the pair of springs, so that when the claws are opened, as in Figs. 1 and 2, the bow-springs are bent, and when the claws are closed the springs will be more nearly straight. The springs, tending to straighten, always act to close the claws upon any article to be grappled as soon as the claws are liberated from the distending-chains $h$, hereinafter described.

The central stem of the grapple is a rod, $k$, ball $l$, and socket $m$, bolted to the crown $c$ and plate $f$, and around this rod $k$ there is a sliding weighted coupling, $l'$, that has a cylindrical shoulder, 6, entering the cylindrical cup 7, so that the ball and socket allow the parts to turn when the coupling $l'$ rests upon the socket $m$ and the cylinder 6 enters the cup 7. I provide for separating the coupling $l'$ after the claws have been opened, so that the parts will be free to accommodate themselves to the article to be grasped by them, the claws, head, and socket turning upon the ball, as indicated by dotted lines. At the upper end of the rod $k$ there is a frame, $n$, carrying the pulley $p$, and an eye, $q$, for the rope or chain by which the apparatus is raised. A sliding sleeve, $o$, upon the rod $k$ has upon it the blocks $r$, through which the chains $h$ pass. If there are eight claws, there will be four of these blocks and four chains, each chain passing through a block, and its ends being attached to the arm-pieces $q'$ of the claws at opposite sides of the crown, so that when the sleeve $o$ is drawn lengthwise up the rod $k$ the claws will be swung open; but the entire head may afterward turn into an inclined position, the chains drawing more or less through their respective blocks, but at the same time holding the claws open.

The pulley $p$ is fastened to its shaft $t$, which shaft projects at opposite sides of the frame $n$, and to it are connected chains or cords $u$, that pass down and are fastened at their lower ends to the head 11 of the sliding sleeve o, and there is a rope or chain, v, around the pulley p, the periphery of such pulley being grooved to receive it, and the inner end of such rope or chain is fastened to the pulley. Hence when this rope or chain v is drawn upon it will revolve the pulley p and wind upon its shaft t the cords or chains u and draw the sleeve o endwise and open the claws a. The grapple is to be lowered into the water by this rope or chain v, so that it will remain open until its weight is taken off the rope or chain v by the grapple resting upon the article that is to be raised. Then the springs close the claws and wind the rope v upon the pulley p more or less, and the grapple is to be raised, with the article it has grasped, by the chain $r^2$.

It is to be understood that the couplings 6 and 7 do not separate until after the claws have been almost entirely opened, because the sleeve o slides endwise within the coupling-cylinder as the claws are opened, and does not move the coupling-cylinder until the flange 12 at the end of such sleeve o comes into contact with the shoulder 14 inside the coupling-tube and moves the same sufficiently to separate the parts, as indicated in Fig. 1, in order that the head of claws may be free to turn upon the ball-joint into any desired inclination to grasp the article that is to be raised.

In Fig. 5 I have shown a means for raising and lowering the grapple without the current diverting it from the proper position. In this there is a vertical mast, 16, to which parallel bars 17 are hinged, as at 18, and these bars are hinged at their outer ends to the stem of the grapple, as at 19, so that the grapple will always be kept vertical, or nearly so, by the parallel motion, and can be lowered to any desired place, and by means of chains 20 to the sides of the vessel, near the stern, the apparatus can be swung around horizontally. It is to be understood that the vessel is anchored, and that its position can be changed from time to time by slackening one cable and hauling in another. The grapple can be operated in the arc of a horizontal circle until all the substances within its reach have been acted upon and raised.

In some instances a spring may be employed in place of the weight $l'$ to cause the coupling 6 to interlock with the cup 7. In this case the spring should be inside a tubular case corresponding to the hollow portion of the weight $l'$, and the upper end of the spring abut against a collar on the stem k.

Sometimes the chains h hang loosely, and may become entangled or the parts misplaced. To prevent this difficulty I employ a rubber strap, $h^2$, with a hook at each end, that is hooked into the chain, with the spring distended, so that the contraction of the rubber will take up any looseness, and always keep the proper tension, to prevent the chains hanging down loosely or becoming entangled.

I claim as my invention—

1. The combination, in a grapple, of a series of radial claws, a crown or head to which they are hinged, springs for closing the claws, chains for opening the same, and a sliding sleeve to act upon such chain, substantially as set forth.

2. The combination, with the hinged claws and their head, of a ball-and-socket joint, a rod connected to the same, and mechanism for opening and closing the claws, substantially as set forth.

3. The combination, in a grapple, of hinged claws, a ball-and-socket joint, a coupling, and the actuating-rod, substantially as set forth, whereby the claws are retained in their proper relation to the rod, substantially as set forth.

4. The combination, with the hinged claws and universal joint, of the rod k, sliding sleeve, chains, pulleys for the chains, and mechanism for moving the sleeve endwise, substantially as set forth.

5. The combination, with the grapple and hoisting mechanism, of the vertical mast and parallel bars, substantially as set forth.

6. The combination, with the hinged claws and chains for opening the same, of the rubber straps $h^2$, or their equivalent, for taking up the slack of the chains and preventing entanglement, substantially as set forth.

Signed by me this 7th day of January, A. D. 1882.

ROY STONE.

Witnesses:
GEO. T. PINCKNEY,
CHAS. H. SMITH.